A. M. LASISTER.
GARDENING IMPLEMENT.
APPLICATION FILED JULY 2, 1917.
1,259,530.
Patented Mar. 19, 1918.
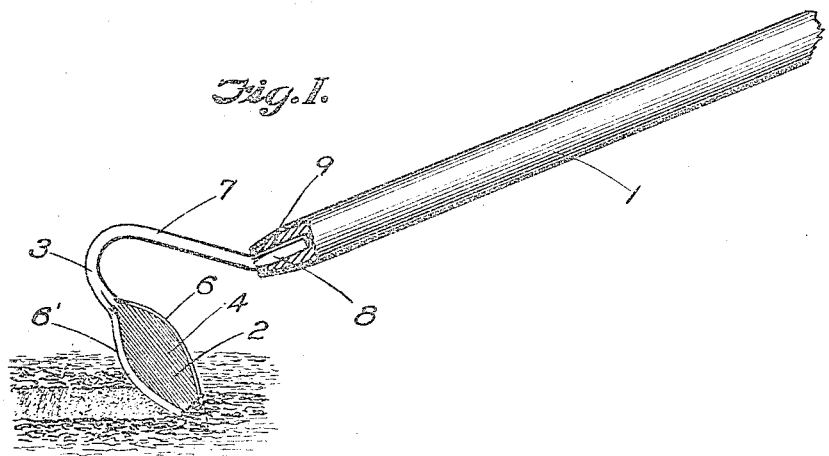
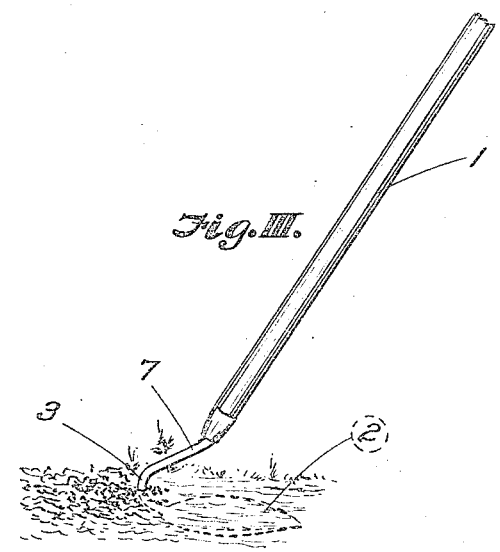
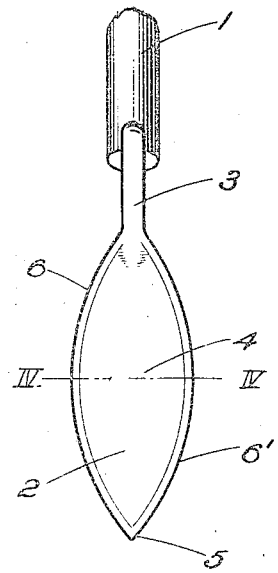
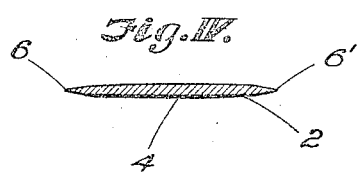
INVENTOR.
Albert M. Lasister.
BY Arthur C. Brown
ATTORNEY

UNITED STATES PATENT OFFICE.

ALBERT M. LASISTER, OF INDEPENDENCE, MISSOURI.

GARDENING IMPLEMENT.

1,259,530.  Specification of Letters Patent.  Patented Mar. 19, 1918.

Application filed July 2, 1917. Serial No. 178,102.

*To all whom it may concern:*

Be it known that I, ALBERT M. LASISTER, a citizen of the United States, residing at Independence, in the county of Jackson and State of Missouri, have invented certain new and useful Improvements in Gardening Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to gardening implements and more particularly to an improved hoe, the principal object of the invention being to provide a device of this character particularly adapted for subsoil cultivating, and for general use in weed cutting, trench forming and for working ground between closely planted vegetables.

In accomplishing these objects, I have provided improved details of structure, the preferred forms of which are illustrated in the accompanying drawings, wherein:

Figure I is a perspective view of a hoe constructed according to the present invention, illustrating its use for trench forming.

Fig. II is an end view of the same.

Fig. III is a perspective view illustrating the use of the hoe for subsoil cultivating.

Fig. IV is a transverse sectional view of the hoe blade on the line IV—IV, Fig. II.

Referring more in detail to the drawings:

The hoe comprises a handle 1, and a blade 2 having a shank 3 extending therefrom and by which it is fixed to the handle 1.

The blade comprises an elongated body, preferably of steel formed into the desired shape, relatively wide at the transverse center, as at 4, and converging to a point 5 at its lower end and into the shank 3 at its upper end, the opposite edges of the blade being regularly curved between the ends and sharpened throughout their length to provide the cutting edges 6—6'.

The shank 3 extends upwardly from the top end of the blade and is then curved rearwardly and downwardly into an elongated portion 7 having a squared head 8 for seating in the end socket 9 of the handle 1; the shank being so curved that the handle will be held in a plane perpendicular to the plane of the blade and at an acute angle therewith so that when the handle is held by the user in a normal working position, the blade will lie substantially parallel with the ground surface.

With the hoe so constructed, it is apparent that the particular shape of the shank 3 and mounting of the blade 5 will permit operation of the blade below the ground surface to loosen the subsoil without excessive loosening of that at the surface, thereby effecting the loosening of earth about the roots of the plants to permit easy growth while leaving the upper surface practically undisturbed to conserve moisture in the ground. It is also apparent that the hoe may be used in this same manner as a weed cutter, as it is possible, because of the improved blade construction, to cut close to the roots and thereby prevent their sprouting.

It will also be noted that the device is an effective tool in making trenches for seed planting and for chopping or digging about closely growing plants.

Having thus described my invention, what I claim as new therein, and desire to secure by Letters-Patent, is:

In a hoe, a flat blade having its greatest width at a point intermediate its ends and narrowing in a gradual curve from the point of the greatest width to a working point and shank end, the opposite longitudinal edges of the blade being sharpened from the working point to the shank end, a shank continuing upwardly from the shank end of the blade and then curved rearwardly and downwardly and a handle fixed on the shank and extending at an acute angle with the plane of the blade.

In testimony whereof I affix my signature.

ALBERT M. LASISTER.

Copies of this patent may be obtained for five cents each, by addressing the "Commissioner of Patents, Washington, D. C."